United States Patent [19]

Otsuki et al.

[11] Patent Number: 5,123,106
[45] Date of Patent: Jun. 16, 1992

[54] MULTIPROCESSOR SYSTEM WITH SHARED MEMORY INCLUDES PRIMARY PROCESSOR WHICH SELECTIVELY ACCESSES PRIMARY LOCAL MEMORY AND COMMON MEMORIES WITHOUT USING ARBITER

[75] Inventors: Haruhiko Otsuki; Tetsuichiro Sasada, both of Tokyo, Japan

[73] Assignee: NEC Corporation, Tokyo, Japan

[21] Appl. No.: 248,088

[22] Filed: Sep. 23, 1988

[30] Foreign Application Priority Data

Sep. 24, 1987 [JP] Japan .................... 62-237532

[51] Int. Cl.⁵ .......................................... G06F 13/18
[52] U.S. Cl. .................... 395/725; 364/DIG. 1; 364/242.6; 364/229; 364/243; 364/228.1
[58] Field of Search ........ 364/134, 132, 200 MS File, 364/900 MS File

[56] References Cited

U.S. PATENT DOCUMENTS

| | | | |
|---|---|---|---|
| 4,219,873 | 8/1980 | Kober et al. | 364/200 |
| 4,396,978 | 8/1983 | Hammer et al. | 364/200 |
| 4,400,775 | 8/1983 | Nozaki et al. | 364/200 |
| 4,459,655 | 7/1984 | Willemin | 364/132 |
| 4,539,636 | 9/1985 | Sääksjärvi | 364/200 |
| 4,539,637 | 9/1985 | De Bruler | 364/200 |
| 4,665,484 | 5/1987 | Nanba | 364/200 |
| 4,860,191 | 8/1989 | Nomura et al. | 364/200 |
| 4,884,195 | 11/1989 | Endo | 364/200 |
| 4,914,572 | 4/1990 | Bitzinger et al. | 364/200 |
| 4,975,833 | 12/1990 | Jinzaki | 364/200 |
| 4,979,096 | 12/1990 | Ueda et al. | 364/200 |

Primary Examiner—Thomas C. Lee
Assistant Examiner—Mehmet Geckil
Attorney, Agent, or Firm—Foley & Lardner

[57] ABSTRACT

In a multiprocessor system comprising a primary processor and at least one subsidiary processor, the primary processor carries out an operation by the use of a predetermined address space divided into first and partial address spaces assigned to the primary processor and to both the primary and the subsidiary processors in common, respectively. The primary processor is coupled to a primary local memory defining the first partial address space while each subsidiary processor is coupled to a common memory to which the second partial address space is assigned by dividing the second partial address space. Each common memory is coupled to the primary processor through a first gate circuit and to each subsidiary processor through a second gate circuit. The first and the second gate circuits are controlled by a controlled to selectively connect the primary and each subsidiary processors to the common memory and to thereby share the same with the primary and each subsidiary processors.

4 Claims, 3 Drawing Sheets

MULTIPROCESSOR SYSTEM WITH SHARED MEMORY INCLUDES PRIMARY PROCESSOR WHICH SELECTIVELY ACCESSES PRIMARY LOCAL MEMORY AND COMMON MEMORIES WITHOUT USING ARBITER

BACKGROUND OF THE INVENTION

This invention relates to a multiprocessor system which comprises a memory resource and a plurality of processors operated in cooperation with the memory resource.

A multiprocessor system of the type described is disclosed by Shinji Nanba in U.S. Pat. No. 4,665,484 assigned to the present assignee, NEC, and is effective to share a memory resource of a main memory by a plurality of processors which concurrently execute a plurality of programs and which are connected to the main memory through buses. In this connection, the memory resource may be called a shared resource which defines a common address space. From this fact, it is readily understood that the shared resource is logically coupled to all of the processors, although it is physically remote from the processors through the buses.

In the multiprocessor system, let a first one of the processors execute a first one of the programs and access the shared resource while the shared resource is being used by another one of the processors. In this case, execution of the first program is awaited in the first processor until reception of an unlock signal indicative of availability of the shared resource. Thus, all of the processors individually execute the programs by the use of a single common address space. This means that all the processors are coupled to one another via the single common address space.

With this structure, every one of the processors is level in operation with one another and therefore can become a control processor when a fault takes place in the multiprocessor system.

However, the microprocessor system requires an intricate bus arbiter to avoid competition or collision of requests which are issued from the processors to use the buses.

Moreover, it is to be noted that the common address space is not used except for a particular purpose because the common address space is physically remote from the processors through the buses. Therefore, the common address space is useless as long as a usual operation is carried out in each processor.

SUMMARY OF THE INVENTION

It is an object of this invention to provide a multiprocessor system which can avoid collision among bus requests issued from processors without use of an intricate arbiter.

It is another object of this invention to provide a multiprocessor system of the type described, which can decrease a useless common address space.

It is yet another object of this invention to provide a multiprocessor system of the type described, which can effectively use a common address space.

According to this invention, a multiprocessor system comprises a memory resource and a processor section operated in cooperation with the memory resource. The memory resource has a predetermined address space divisible into a first partial address space and a second partial address space and comprises a primary local memory and a common memory which define the first and the second partial address spaces, respectively. The processor section comprises a primary processor operated by selectively using both the first and the second partial address spaces to selectively access the primary local memory and the common memory, and a subsidiary processor operated by selectively using the second partial address space common to said primary processor. The multiprocessor system comprises a controller coupled to the primary and the subsidiary processors and the primary local and the common memories for controlling the primary and the subsidiary processors to selectively connect the primary and the subsidiary processors to the common memory.

DESCRIPTION OF THE PREFERRED EMBODIMENT

Figure 1:
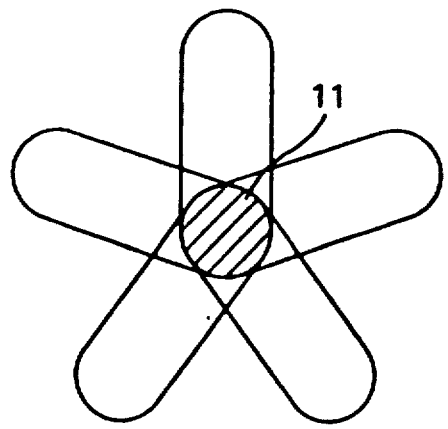
FIG. 1 is a conceptual view of a conventional address space used by a plurality of processors in common.

Referring to FIG. 1, description will be made for a better understanding of this invention regarding a conventional notion which relates to a common address space 11 depicted by a hatched portion in the center of this figure. The common address space 11 may be recognized as being an address space of a memory resource which is placed in a part of a main memory (not shown). The illustrated common address space 11 is shared with five processors which have local address spaces radially extended from the hatched portion in FIG. 1, respectively. This shows that each local address space of the processors is coupled to one another through the common address space 11. Such coupling of the local address spaces is disadvantageous as pointed out in background section of the instant specification.

Figure 2:
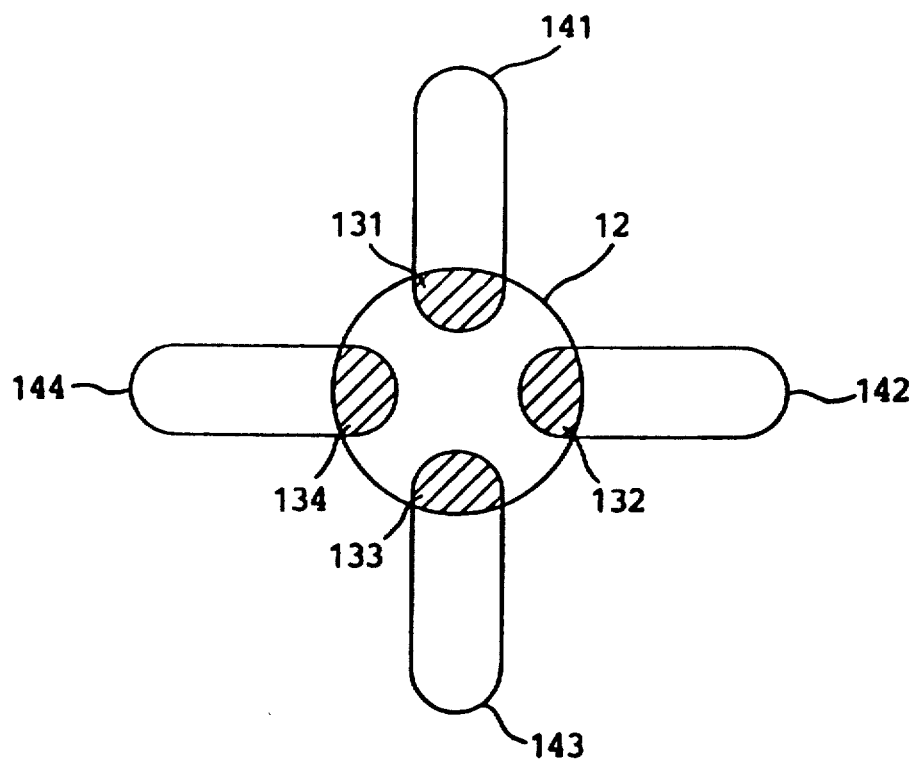
FIG. 2 is a similar view of an address space according to this invention.

Referring to FIG. 2, description will be made regarding notion of this invention wherein a plurality of processors are classified into a single primary processor and at least one of a number of subsidiary processors. In FIG. 2, the subsidiary processors are assumed to be equal in mumber to four. The primary processor is operated by the use of a predetermined address space 12 which is depicted as a circle in FIG. 2 and which may be recognized as being an address space of a part of a memory resource, as will become clear.

The illustrated predetermined address space for the primary processor is divided into first and second partial address spaces which are depicted at unhatched and hatched portions, respectively. The first partial address space is exclusively used by the primary processor. On the other hand, the first through the fourth local address spaces 131 to 134 for the primary processor are shared with first through fourth ones of the subsidiary processors, as shown by hatches and may be therefore called first through fourth common address spaces. This shows that the first through the fourth local address spaces 131 to 134 also serve as local address spaces for the first through the fourth subsidiary processors. In FIG. 2, the address spaces for the first through the fourth subsidiary processors are shown by first through fourth rod-shaped portions 141 to 144. From this fact, it may be considered that the address spaces for the subsidiary processors are partially included in the predetermined address spaces for the primary processor. In other words, the first through the fourth common address spaces which are used by the primary processor in common are assigned to the respective subsidiary processors. Thus, a whole address space is given by a sum of the first partial address space for the primary processor, the first through the fourth common address spaces 131 to 134, and the remaining address spaces for the first through the fourth subsidiary processors.

In order to practically provide the first partial address space and the first through the fourth common address spaces 131 to 134, the memory resource comprises a primary local memory for the first partial address space and first through fourth common memories for the first through the fourth local address space, as will be described later. In addition, first through fourth subsidiary local memories are included to provide the remaining address spaces of the first through the fourth subsidiary processors except for the first through the fourth common address spaces.

In this event, the first through the fourth common address spaces may be physically located as local address spaces for the first through the fourth subsidiary processors, respectively, while they may be logically located not only as the local address spaces for the first through the fourth subsidiary processors but also local address spaces for the primary processor.

Figure 3:
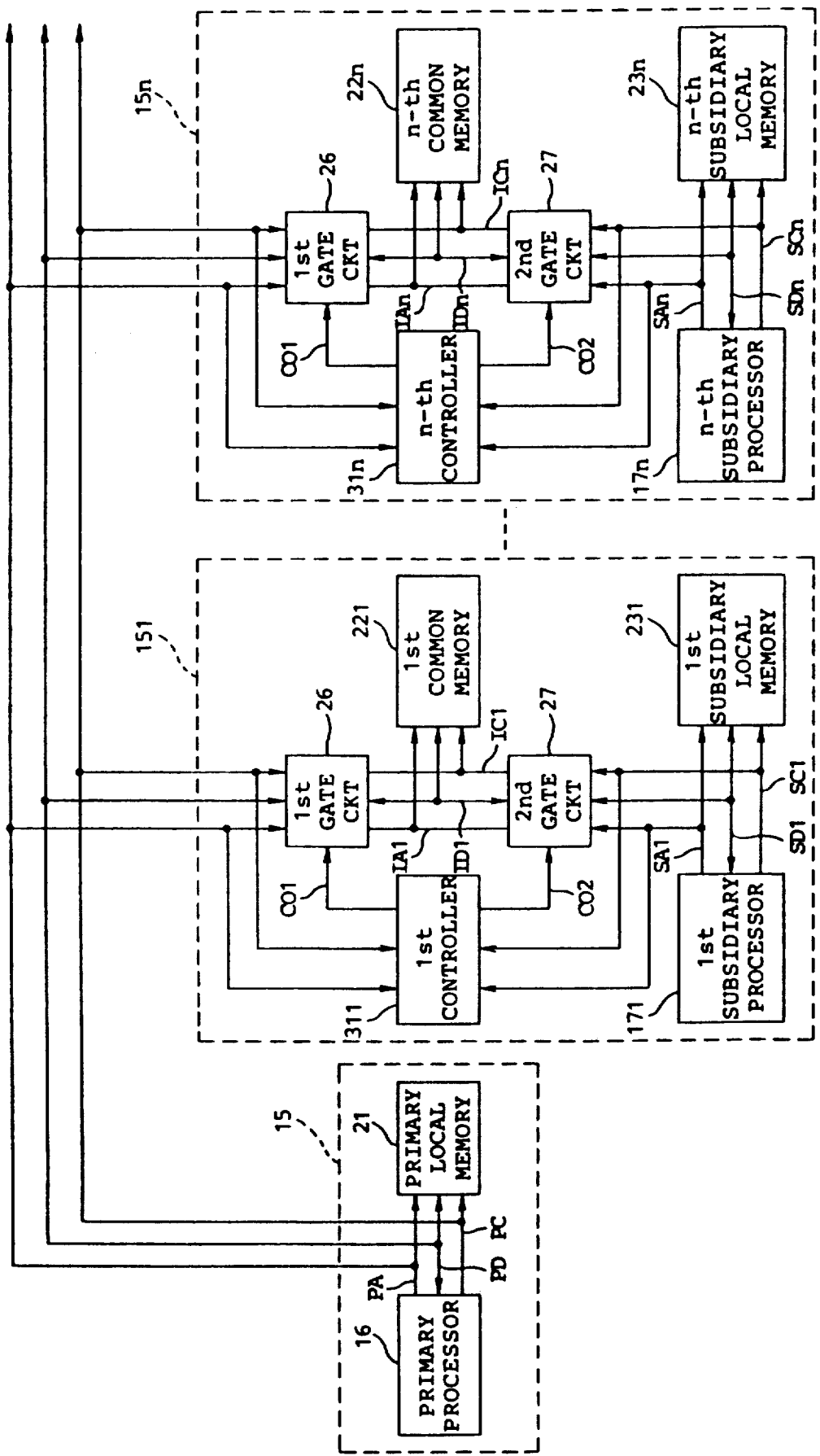
FIG. 3 is a block diagram of a multiprocessor system according to a preferred embodiment of this invention.

Referring to FIG. 3, a multiprocessor system according to a preferred embodiment of this invention comprises a single primary portion 15 and first through n-th subsidiary portions 151 to 15n, where n is a natural number equal to or greater than unity and may be, for example, thirty six. The primary portion 15 comprises a primary processor 16 while the first through the n-th subsidiary portions 151 to 15n comprise first through n-th subsidiary processors 171 to 17n. The primary processor 16 and the first through the n-th subsidiary processors 171 to 17n can individually execute independent programs and may be collectively called a processor portion.

In addition, the primary portion 15 comprises a primary local memory 21 which provides the first partial address space described in FIG. 2 while the first through the n-th subsidiary portions 151 to 15n comprise first through n-th common memories 221 to 22n and first through n-th subsidiary local memories 231 to 23n which provide first through n-th common address spaces and first through n-th subsidiary address spaces, respectively, as described in conjunction with FIG. 2. The predetermined address space of the primary processor 16 is equal to a sum of the first partial address space and the first through the n-th common address spaces. The predetermined address space may be, for example, $2^{22}$ and may therefore be specified by 22 bits. In this event, the first partial address space may be equal to $2^{16}$ while the first through the n-th common address spaces may be formed by the remaining address spaces.

At any rate, the primary local memory 21, the first through the n-th common memories 221 to 22n, and the first through the n-th subsidiary local memories 231 to 23n serve as a memory resource and may be therefore collectively called a resource section. The primary local memory 21 and the first through the n-th subsidairy local memories 231 to 23n are exclusively used by the primary processor 16 and the first through the n-th subsidiary processors 171 to 17n, respectively. On the other hand, the first through the n-th common memories 221 to 22n are used by the first through the n-th subsidiary processors 171 and 17n, respectively, in addition to the primary processor 16.

From this fact, it is readily understood that each of the first through the n-th common memories 221 to 22n must be selectively accessed by the primary processor 16 and each of the first through the n-th subsidiary processors 171 to 17n. To this end, the first through the n-th common memories 221 to 22n of the respective subsidiary portions 151 to 15n are coupled to the primary processor 16 through first gate circuits 26 on one hand and to the subsidiary processors 171 to 17n through second gate circuits 27 on the other hand.

The first and the second gate circuits 26 and 27 of the first through the n-th subsidiary portions 151 to 15n are controlled by first through n-th controllers 311 to 31n in a manner to be described later, respectively.

More particularly, the primary processor 16 and the primary local memory 21 are connected to each other through a primary address bus PA, a primary data bus PD, and a primary control bus PC which are also connected to the first gate circuits 26 of the first through the n-th subsidiary portions 151 to 15n, respectively. The primary address bus PA and the control bus PC are connected in pair to the first through the n-th controllers 311 to 31n to control the first and the second gate circuits 26 and 27 thereof, respectively.

In addition, an i-th one of the first through the n-th subsidiary processors 171 to 17n is connected to an i-th one of the first through the n-th subsidiary local memories 231 to 23n through an i-th one of first through n-th subsidiary address bus SAi, an i-th one of first through n-th subsidiary data bus SDi, and an i-th one of first through n-th subsidiary control bus SCi, where i is a natural number variable between unity and n, both inclusive. For example, the first subsidiary processor 171 is connected to the first subsidiary local memory 231 through the first subsidiary address bus SA1, the first subsidiary data bus SD1, and the first subsidiary control bus SC1. The remaining second through the n-th subsidiary processors 172 to 17n are connected to the second through the n-th subsidiary local processors 232 to 23n in a like manner.

The i-th subsidiary address bus SAi, the i-th subsidiary data bus SDi, and the i-th subsidiary control bus SCi are also connected to the second gate circuit 27 of the i-th subsidiary portion 15i while the i-th subsidiary address bus SAi and the i-th subsidiary control bus SCi are connected in pair to the i-th controller 31i.

The first and the second gate circuits 26 and 17 of the i-th subsidiary portion 15i are connected to each other through an i-th internal address bus IAi, an i-th internal data bus IDi, and an i-th internal control bus ICi which are also connected to the i-th common memory 22i.

Figure 4:
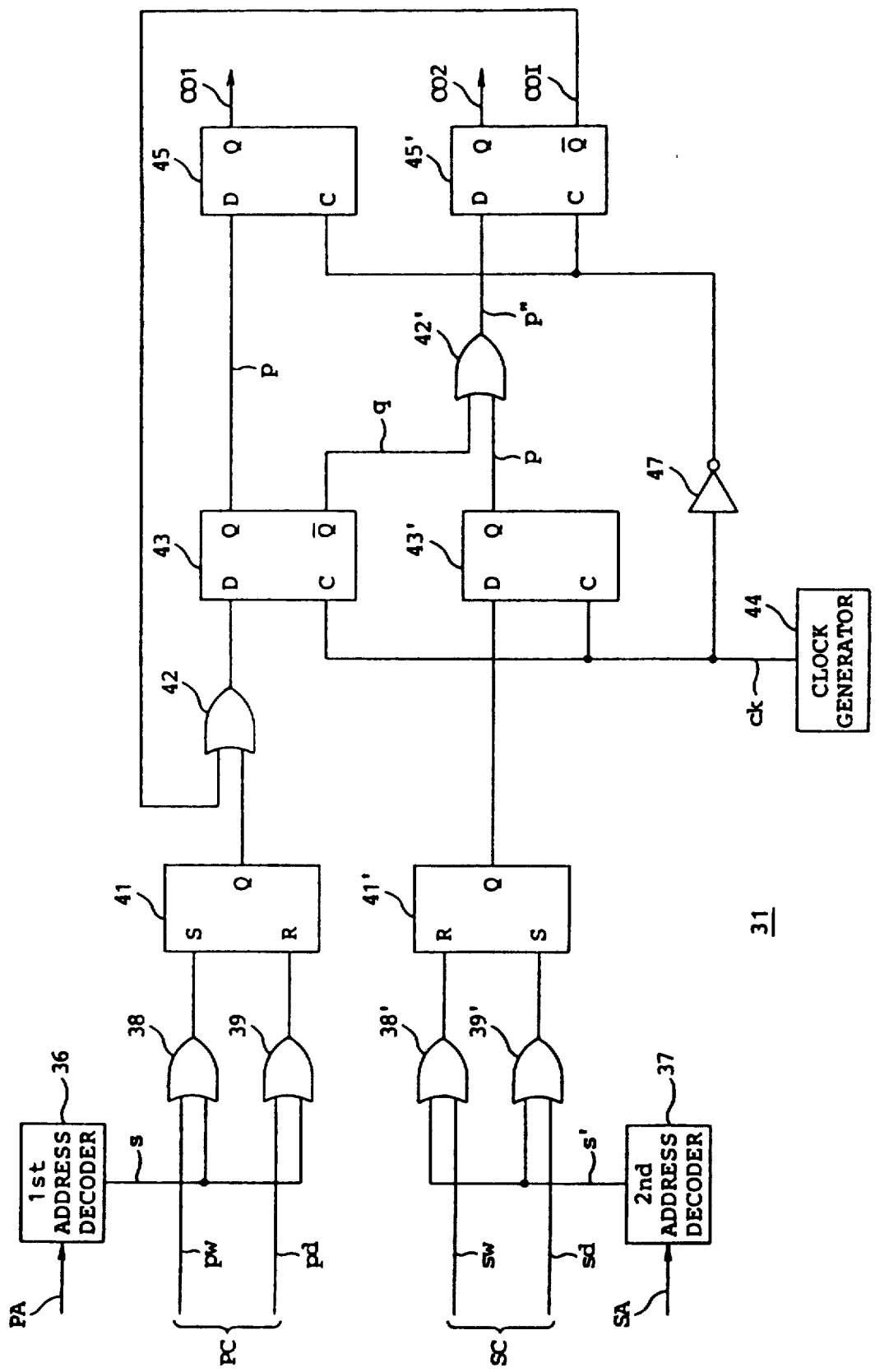
FIG. 4 is a block diagram of a controller for use in the microprocessor illustrated in FIG. 3.

Referring to FIG. 4 together with FIG. 3, each of the first through the n-th controllers 311 to 31n is similar in operation and structure to one another. In this connection, a single one of the first through the n-th controllers 311 to 31n is illustrated in FIG. 4 and depicted at 31 (suffix omitted) in FIG. 4. The illustrated controller 31 is supplied with primary and subsidiary address signals through the primary and the subsidiary address buses PA and SA. Each of the primary and the subsidiary address signals may be, for example, of twenty-two bits. In addition, primary and subsidiary control signals are also supplied from the primary and the subsidiary processors of the subsidiary portion to the controller 31. The controller 31 is operable to deliver first and second control signlas CO1 and CO2 to the first and the second gate circuits 26 and 27 of the subsidiary portion in question, respectively. Specifically, the illustrated controller 31 serves to selectively open and close each of the first and the second gate circuits 26 and 27 to connect either one of the primary processor 16 and the subsidiary processor 17 of the subsidiary portion to the common memory 22 (suffix omitted).

Herein, it is assumed that the common memory 22 has a reserved semaphore area of a single byte at a preselected address of the common memory. The preselected address is determined at every one of the first through the n-th common memories 221 to 22n and is accessed only by the preselected address given from either the primary processor 16 or the subsidiary processor. The semaphore area is always loaded with a zero data signal. In this connection, the common memory is not accessed during a usual operation.

In FIGS. 3 and 4, the primary processor 16 sends a primary read request and a primary write request through the primary control bus PC to the first through the n-th controllers 311 to 31n in a well known manner. Likewise, each subsidiary processor 17 also delivers a subsidiary read request and a subsidiary write request to the controller 31 of the subsidiary section through the subsidiary control bus SC. The primary and the subsidiary read requests for the semaphore area are helpful to connect the common memory 22, as will become clear, and may be called primary and subsidiary bus connection requests, respectively. On the other hand, the primary and the subsidiary write requests for the semaphore area are helpful to release or disconnect the common memory 22 from the buses and may be called primary and subsidiary bus release requests. Such bus connection requests and bus release requests may be referred to as bus requests. The primary read request and the primary write request are produced in the form of a primary read signal pd and a primary write signal pw together with the preselected address for the semaphore area while the subsidiary read request and the subsidiary write request are produced as a subsidiary read signal sd and a subsidiary write signal sw together with the preselected address. Each of the read signals pd and sd and the write signals pw and sw takes a logic "0" level when each request is issued from the primary and the subsidiary processors 16 and 17. Otherwise, each of the signals pd, sd, pw, and sw takes the logic "1" level.

In FIG. 4, the illustrated controller 31 comprises a first address decoder 36 and a second address decoder 37 supplied with the primary and the subsidiary address signals through the primary and the subsidiary address buses PA and SA, respectively. Each of the first and the second address decoders 36 and 37 produces a logic "1" level as long as the preselected address for the semaphore area is not detected by each of the first and the second decoders 36 and 37. Otherwise, the first and the second address decoders 36 and 37 produce logic "0" levels as primary and subsidiary detection signals s and s', respectively.

In the example being illustrated, the primary detection signal s is detected by the first address decoder 36 and delivered to first and second primary gates 38 and 39 which are operable in response to the primary write signal pw and the subsidiary read signal sd, respectively. Likewise, the subsidiary detection signal s' is delivered to first and second subsidiary gates 38' and 39' which are supplied with the subsidiary write signal sw and the subsidiary read signal sd, respectively.

Let the primary bus connection request be issued from the primary processor 16 by producing the primary read signal pd and the preselected address. When the first address decoder 36 detects the preselected address and produces the primary detection signal s of the logic "0" level with the primary read signal pd of the logic "0" level given to the second primary gate 39, the second primary gate 39 delivers a logic "0" level signal as a reset signal to a first primary flip-flop 41. As a result, the first primary flip-flop 41 is reset to produce an output signal of the logic "0" level. In this event, the output signal of the logic "0" level is sent through an OR gate 42 to a second primary flip-flop 43 when the subsidiary read and write requests are not produced, as will become clear as the description proceeds. The second primary flip-flop 43 is operated in synchronism with a sequence of clock pulses sent from a clock generator 44. Consequently, the second flip-flop 43 is operable in response to the output signal of the logic "0" level and the clock pulse sequence ck to produce a positive signal p of the logic "0" level and a negative signal q of the logic "1" level. Responsive to the positive signal p of the logic "0" level, a third primary flip-flop 45 produces the first control signal CO1 of the logic "0" level in timed relation to the clock pulse sequence ck given through an inverter 47. The first control signal CO1 of the logic "0" level is delivered to the first gate circuit 26 (FIG. 3) to open the first gate circuit 26.

As a result, the zero data signal is read out of the semaphore area of the common memory 22 in response to the read request to the semaphore area. Thus, it is possible to detect that the primary bus connection request is received by monitoring the zero data signal read out of the semaphore area.

When the subsidiary bus connection request is issued from the subsidiary processor, similar operation is carried out in the illustrated controller 31. Specifically, the subsidiary read signal sd is given to the second subsidiary gate 39' with the subsidiary detection signal s' of the logic "0" level given from the second address decoder 37. Thereafter, first, second, and third subsidiary flip-flops 41', 43', and 45' and an OR gate 42' are operated in a manner similar to the first, the second, and the third primary flip-flops 41, 43, and 45, and the OR gate 42 to deliver the second control signal CO2 to the second gate circuit 27. It is to be noted in FIG. 4 that the OR gate 42' is coupled to the second primary flip-flop 43 and the second subsidiary flip-flop 43' and the third subsidiary flip-flop 45'. In this connection, the OR gate 42' produces the logic "0" level signal p" in response to the negative output signal q of the logic "0" level and a positive output signal p' of the logic "0" level. From this fact, it is readily understood that the OR gate 42' delivers the logic "0" level signal p" to the third subsidiary flip-flop 45' to put the third flip-flop 45' in a reset state and to thereby make the same produce the second control signal CO2 when the second detection signal s' is detected by the second address decoder 37 or when no first detection signal s is detected by the first address decoder 37 to put the second primary flip-flop 43 into the set state. During the production of the second control signal CO2 of the logic "0" level, the third subsidiary flip-flip 45' sends an internal control signal CO1 of the logic "1" level to the OR gate 42 so as to put the second and the third primary flip-flops 43 and 45 into the set states and to thereby render the first control signal CO1 into the logic "1" level. The first control signal CO1 of the logic "1" level serves to close the first gate circuit 26. During closure of the first gate circuit 26, the zero data signal is not read out of the semaphore area of the common memory 22. This shows that the primary bus connection request from the primary processor 16 to the semaphore area is not received by the common memory.

On the other hand, it is assumed that the primary bus release request is issued in the form of the primary write signal pw of the logic "0" level from the primary processor 16 to access the common memory 22. In this event, the first detection signal s of the logic "0" level and the primary write signal pw of the logic "0" level are sent through the first primary gate circuit 38 to put the first primary flip-flop 41 into the set state. As a result, the second and the third primary flip-flops 43 and 45 are put into the set states to close the first gate circuit 26. Thus, the bus request to the common memory 22 is released by the primary write signal pw.

The bus request from the subsidiary processor 17 is processed by the use of the subsidiary read signal sd and the subsidiary write singal sw in a manner similar to the bus request from the primary processor 16.

Herein, let the primary read signal pd and the subsidiary read signal sd be simultaneously produced from the primary processor 16 and the subsidiary processor 17. In this case, the first primary and the first subsidiary flip-flops 41 and 41' are concurrently put into the reset states to be sent to the second primary and the second subsidiary flip-flops 43 and 43' in synchronism with the clock pulse ck. Therefore, the second primary and the second subsidiary flip-flops 43 and 43' are simultaneously rendered into the reset states. However, the negative output signal q of the second primary flip-flop 43 takes the logic "1" level and is sent through the OR gate 42' to the third subsidiary flip-flop 45'. Consequently, the OR gate 42' delivers the logic "1" level signal p'' to the third subsidiary flip-flop 45' to keep the third subsidiary flip-flop 45' at the logic "1" level. Therefore, the third subsidiary flip-flop 45' sends the second control signal CO2 of the logic "1" level to close the second gate circuit 27.

On the other hand, the third primary flip-flop 45 is kept at the logic "0" level in response to the positive signal p of the logic "0" level given from the second primary flip-flop 43. As a result, the third primary flip-flop 45 delivers the first control signal CO1 of the logic "0" level to the first gate circuit 26. This means that the bus request from the primary processor 16 is processed in preference to the bus request from the subsidiary processor 17.

Thus, each of the first through the n-th controllers 311 to 31n is very simple in structure in comparison with an arbiter which is used in a conventional multiprocessor system and which comprises complicated circuitry for arbitrating bus requests issued from three processors or more. This is because each controller 31 may open or close the corresponding common address space for the primary processor 16.

With this structure, each of the common memories is used in common to the primary processor 16 and each of the subsidiary processors 171 to 17n. Therefore, the common memory address spaces are effectively utilized by the primary and the subsidiary processors 16 and 171 to 17n.

In addition, it is possible to avoid collision of the bus requests between the primary and each subsidiary processors by the use of the first and the second gate circuits 26 and 27 which cooperate with the controller. The second gate circuit 27 serves to selectively connect the subsidiary processor to the subsidiary local memory and the common memory.

While this invention has been described in conjuction with a preferred embodiment thereof, it will readily be possible for those skilled in the art to put this invention into practice in various other manners. For example, the subsidiary processor may be equal in number to unity.

What is claimed is:

1. A multiprocessor system comprising:
   a memory resource and a processor section operated in cooperation with said memory resource, said memory resource having a predetermined address space which is divided into a first partial address space and a second partial address space and including a primary local memory and a common memory which define said first and said second partial address spaces, respectively, said processor section including a primary processor operated by selectively using both said first and said second partial address spaces to selectively access said primary local memory and said common memory, and a subsidiary processor operated by selectively using a common address space which is defined within said second partial address space and which is in common with said primary processor, said common address space including a semaphore area specified by a predetermined semaphore address;
   each of said primary processor and said subsidiary processor including
     means for producing an access request signal including said predetermined semaphore address to access said common memory; and
     controlling means, coupled to said primary processor and to said subsidiary processor and to said primary local memory and to said common memory, for controlling said primary processor and said subsidiary processor to selectively connect said primary processor and said subsidiary processor to said common memory in response to said access request signal.

2. A multiprocessor system as claimed in claim 1, wherein said memory resource further comprises:
   s subsidiary local address space distinct from said first and said second partial address spaces; and
   a subsidiary local memory which is coupled to said subsidiary processor and to said common memory and which has said subsidiary local address space.

3. A multiprocessor system comprising:
   a memory resource and a processor section operated in cooperation with said memory resource, said memory resource having a predetermined address space which is divided into a first partial address space, and a second partial address space which is divided into first through n-th local address spaces and including a primary local memory which defines said first partial address space, and first through n-th common memories which define said first through said n-th local address spaces, respectively, said common memories including semaphore areas specified by predetermined semaphore addresses;
   said processor section including a primary processor operated by selectively using both said first and said second partial address spaces to selectively access said primary local memory and said first through n-th common memories;

first through n-th subsidiary processors each of which is operated by selectively using one of said first through n-th local address spaces that is determined for said first through n-th subsidiary processors and that is common to said primary processor, each of said first through n-th subsidiary processors including means for producing an access request signal which includes each of said predetermined semaphore addresses designated for said first through n-th subsidiary processors to access one of said predetermined semaphore addresses of said first through n-th common memories; and first through n-th controlling means, each of which is coupled to said primary processor and to an associated one of said first through n-th common memories, for controlling said primary processor and an associated one of said first through n-th subsidiary processors to selectively connect said primary processor and said associated one of said first through n-th subsidiary processors to said associated one of said first through n-th common memories in response to said access request signal.

4. A multiprocessor system as claimed in claim 3, wherein said memory resource further comprises:

first through n-th subsidiary local memories each of which is coupled to an associated one of said first through n-th subsidiary processors and to an associated one of said first through n-th common memories and which have first through n-th subsidiary local address spaces distinct from said predetermined address space.

* * * * *